(12) United States Patent
Gallant

(10) Patent No.: US 8,140,884 B2
(45) Date of Patent: Mar. 20, 2012

(54) EFFICIENT TIME-BASED MEMORY COUNTERS

(75) Inventor: John Kenneth Gallant, Plano, TX (US)

(73) Assignee: Verisign, Inc., Reston, VA (US)

( * ) Notice: Subject to any disclaimer, the term of this patent is extended or adjusted under 35 U.S.C. 154(b) by 632 days.

(21) Appl. No.: 12/176,219

(22) Filed: Jul. 18, 2008

(65) Prior Publication Data

US 2010/0017640 A1 Jan. 21, 2010

(51) Int. Cl.
*G06F 1/00* (2006.01)
*G06F 1/14* (2006.01)

(52) U.S. Cl. .................. 713/502; 713/500; 713/501

(58) Field of Classification Search .......... 713/500–502; 365/129; 702/176
See application file for complete search history.

(56) References Cited

U.S. PATENT DOCUMENTS

| | | | |
|---|---|---|---|
| 6,674,805 B1 | 1/2004 | Kovacevic et al. | |
| 7,076,623 B1 | 7/2006 | Ito et al. | |
| 2003/0182080 A1* | 9/2003 | Greenlaw et al. | 702/178 |
| 2005/0249206 A1 | 11/2005 | Wybenga et al. | |
| 2006/0007857 A1 | 1/2006 | Kozuki | |
| 2006/0265526 A1 | 11/2006 | Holbrook | |
| 2007/0073954 A1 | 3/2007 | Wang | |
| 2007/0286327 A1 | 12/2007 | Love et al. | |
| 2007/0294394 A1 | 12/2007 | Britt | |
| 2008/0002576 A1 | 1/2008 | Bugenhagen et al. | |
| 2008/0005156 A1* | 1/2008 | Edwards et al. | 707/102 |
| 2008/0043899 A1* | 2/2008 | Gara et al. | 377/118 |
| 2008/0279183 A1* | 11/2008 | Wiley et al. | 370/389 |
| 2009/0122949 A1 | 5/2009 | Reid et al. | |

OTHER PUBLICATIONS

International Search Report and Written Opinion of PCT Application No. PCT/US2009/050994, mailed Aug. 27, 2009, 7 pages total.

* cited by examiner

*Primary Examiner* — Thomas J Cleary
(74) *Attorney, Agent, or Firm* — Finnegan, Henderson, Farabow, Garrett & Dunner, L.L.P.

(57) ABSTRACT

Some embodiments of efficient time-based memory counters have been presented. In one embodiment, a set of arrays of counters is arranged in layers to associate the set of arrays with a set of predefined time intervals. Furthermore, a set of pointers may be used to reference the set of arrays of counters. An index is maintained to provide time-based management of the arrays of counters. The index includes a timestamp and the set of pointers. Each pointer logically points to a distinct one of the set of arrays.

20 Claims, 9 Drawing Sheets

US 8,140,884 B2

EFFICIENT TIME-BASED MEMORY COUNTERS

TECHNICAL FIELD

Embodiments of the present invention relate to counters, and more specifically to efficient time-based management of counters.

BACKGROUND

Today, counters are widely used in various applications for measurement or data collection. Conventionally, multiple counters are used to maintain counts that span across a lengthy period of time. According to one conventional approach, different counters are associated with different count intervals and a separate index is maintained for each count interval. Using separate merge processes, new counts are computed and stored in the counters, which may run continuously. Likewise, memory reclamation under this conventional approach is a separate process, which prunes large amounts of data at once.

However, the above conventional approach suffers from many disadvantages. For example, the above approach uses a lot of memory storage in order to maintain the counters and their indices. Furthermore, the separate merge processes also place a burden on the overall processing. Another disadvantage of the conventional approach is the large granularity of the memory reclamation, which leads to a larger requirement for processing and memory capacity.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
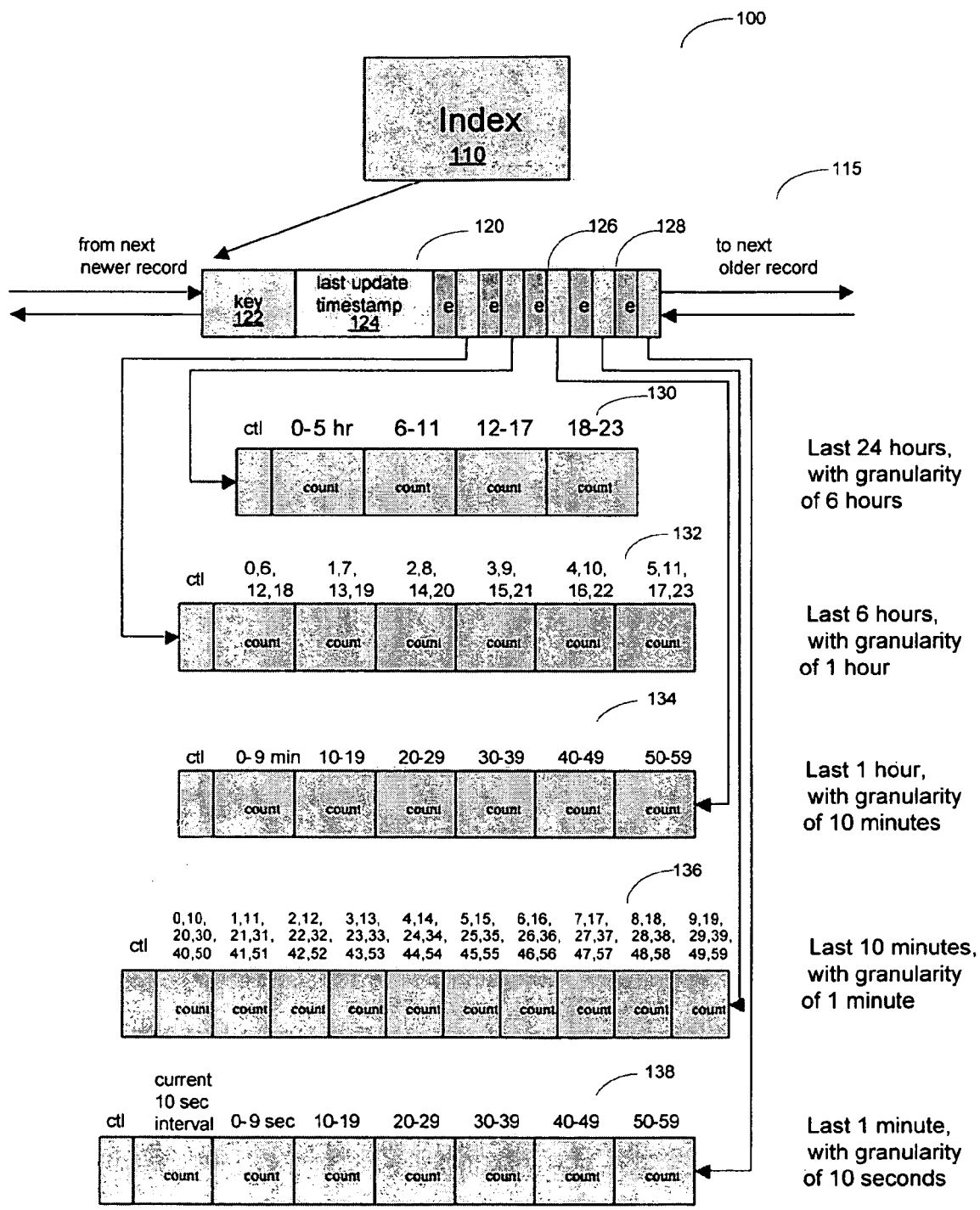
FIGS. 1A-1D illustrate one embodiment of time-based memory counters.

Described herein are some embodiments of efficient time-based memory counters. In one embodiment, a set of arrays of counters is arranged in layers to associate the set of arrays with a set of predefined time intervals. Furthermore, a set of pointers is used to reference the set of arrays of counters. An index containing the set of pointers is maintained to provide time-based management of the arrays of counters. Each pointer logically points to a distinct one of the set of arrays. The index further includes a timestamp. The counts in the counters are maintained relative to the timestamp in the index. More details of some embodiments of the efficient time-based memory counters are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates one embodiment of efficient time-based memory counters. Referring to FIG. 1A, the time-based memory counters 100 include in one embodiment five arrays of counters 130, 132, 134, 136, and 138. The arrays of counters 130, 132, 134, 136, and 138 are logically coupled to a record 120. The record 120 in one embodiment is one of a two-way linked list 115 of records. In one embodiment, the records in the two-way linked list 115 are linked in chronological order.

The record 120 is described in further detail below as an example. The records in the two-way linked list 115 and the counters may be implemented in one embodiment using memory blocks. In one embodiment, a memory block is defined to be 128 byte and the records within each block are of the same size. For example, the size may range from 32 4-byte records in a block to 1 128-byte record in a block. In one embodiment, the record 120 includes a key 122, a timestamp field 124, and a number of pointers 126. In one embodiment, there are five pointers. Each of the pointers 126 logically points to a distinct array of counters 130, 132, 134, 136, and 138.

The time-based memory counters 100 may be accessed via an index 110. For example, the index 110 may include a logical pointer to the key 122 of the record 120. To access a different record in the linked list of records 115, the pointer of the index 110 may be set to point to the key of the record of interest.

In some embodiments, all counts in the array of counters 130, 132, 134, 136, and 138 are relative to the timestamp in timestamp field 124 in the record 120. Each of the arrays of counters 130, 132, 134, 136, and 138 is associated with a predetermined time interval, which may also be referred to as buckets. In one embodiment, each of the counters in array 130 is associated with a six-hour time interval. For example, the first counter in array 130 is associated with 0-5 hours, the second counter in array 130 is associated with 6-11 hours, the third counter in array 130 is associated with 12-17 hours, and the fourth counter in array 130 is associated with 18-23 hours.

On the next level, in one embodiment, array 132 has six (6) counters, each associated with an one-hour time interval. For example, the first counter in array 132 is associated with hour 0, hour 6, hour 12, or hour 18. The second counter in array 132 is associated with hour 1, hour 7, hour 13, or hour 19. The third counter in array 132 is associated with hour 2, hour 8, hour 14, or hour 20. The fourth counter in array 132 is associated with hour 3, hour 9, hour 15, or hour 21. The fifth counter in array 132 is associated with hour 4, hour 10, hour 16, or hour 22. The sixth counter in array 132 is associated with hour 5, hour 11, hour 17, or hour 23. Thus, in one embodiment, the counters in the array 132 are associated with consecutive hours within a six-hour time block.

On the next level, in one embodiment, array 134 has six (6) counters, each associated with a ten-minute time interval. For example, the first counter in array 134 is associated with 0-9 minutes, the second counter in array 134 is associated with 10-19 minutes, the third counter in array 134 is associated with 20-29 minutes, the fourth counter in array 134 is associated with 30-39 minutes, the fifth counter in array 134 is associated with 40-49 minutes, and the sixth counter in array 134 is associated with 50-59 minutes.

On the next level, in one embodiment, array 136 has ten (10) counters, each associated with a one-minute time interval. For example, the first counter in array 136 is associated with minute 0, minute 10, minute 20, minute 30, minute 40, or minute 50. The second counter in array 136 is associated with minute 1, minute 11, minute 21, minute 31, minute 41, or minute 51. The third counter in array 136 is associated with minute 2, minute 12, minute 22, minute 32, minute 42, or minute 52. The fourth counter in array 136 is associated with minute 3, minute 13, minute 23, minute 33, minute 43, or minute 53. The fifth counter in array 136 is associated with minute 4, minute 14, minute 24, minute 34, minute 44, or minute 54. The sixth counter in array 136 is associated with minute 5, minute 15, minute 25, minute 35, minute 45, or minute 55.

On the last level, in one embodiment, array 138 has seven (7) counters, each associated with a ten-second time interval. The first counter in array 138 is associated with a current 10-second time interval. The second counter in array 138 is associated with 0-9 second, the third counter in array 138 is associated with 10-19 second, the fourth counter in array 138 is associated with 20-29 second, the fifth counter in array 138 is associated with 30-39 second, the sixth counter in array 138 is associated with 40-49 second, and the seventh counter in array 138 is associated with 50-59 second.

Alternate array sizes, numbers, and distribution of values may be used. For example, in one embodiment, where the counters are used in a real-time application, timeframes of microseconds/milliseconds/tenths of seconds/1 second/10 seconds/30 seconds, etc., may be used. In an alternate embodiment, where the counters are used in a long-scale application (e.g., trending), timeframes of 1 day/2 days/5 days/10 days/30 days, etc., may be used.

In some embodiments, the stored time and the new time are compared when the overall count structure is to be incremented. If time boundaries have been crossed, then some of the time-based memory counters 100 are updated and the appropriate count(s) is placed in counters associated with the proper time interval, using modulo arithmetic in some embodiments. If the boundary crossed is larger than the entire time interval covered by an array of counters, then the counts in those counters are discarded. In addition, counters corresponding to time intervals that are too old with respect to the new time are also cleared. The old timestamp in the timestamp field 124 is then overwritten or replaced by a new timestamp indicative of the new time.

In some embodiments, reclamation and de-reclamation of the counters 100 are supported. Specifically, one or more of the E flags 128 in the record 120 may be set or reset to enable or disable, respectively, reclamation. When an E flag is set, it indicates that contents in the associated counters for a time period are not to be kept. In some embodiments, the two-way linked list 115 allows traversing the records from the oldest-updated to the newest-updated in order to perform reclamation.

Figure 1B:
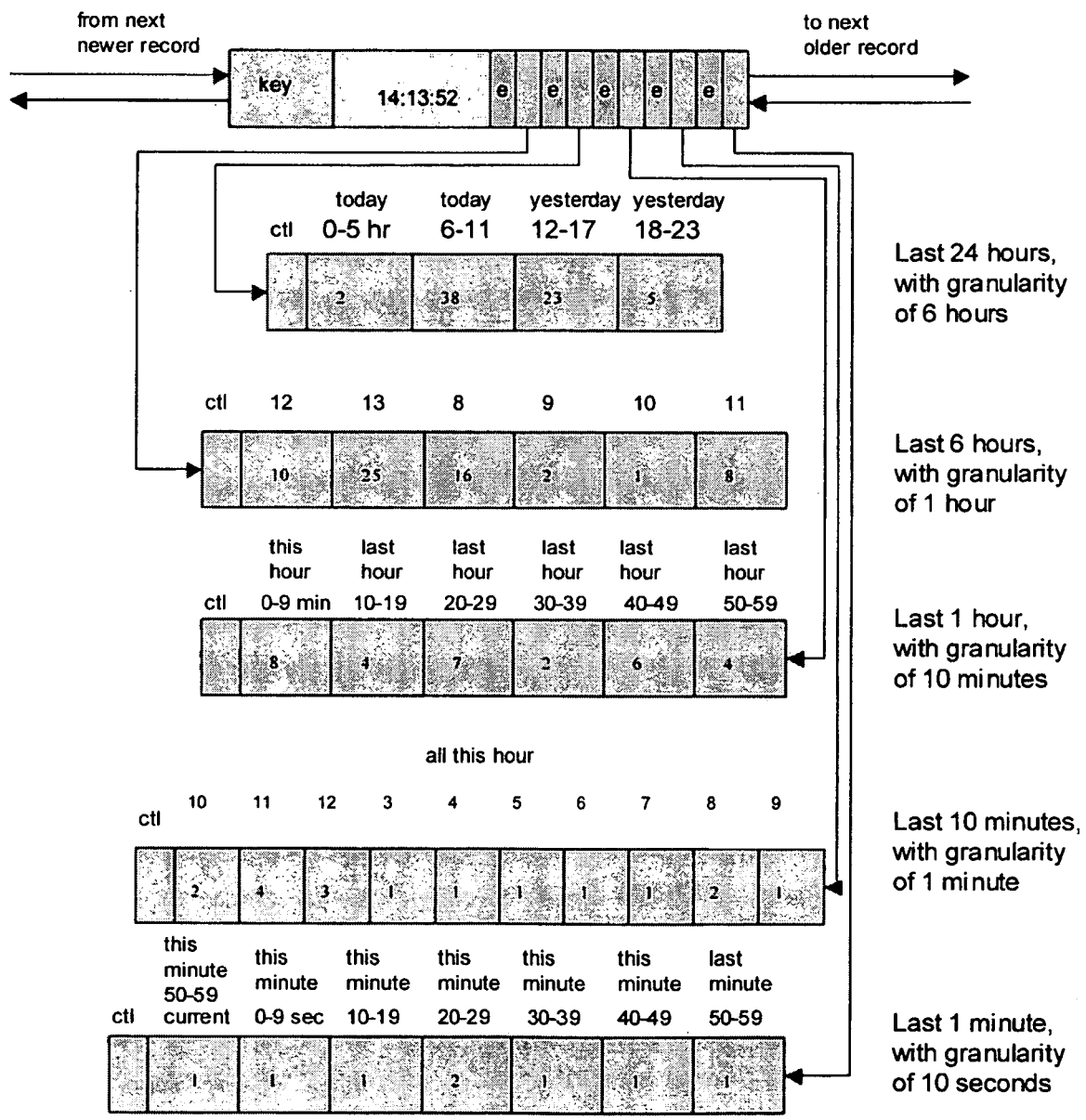
Figure 1C:
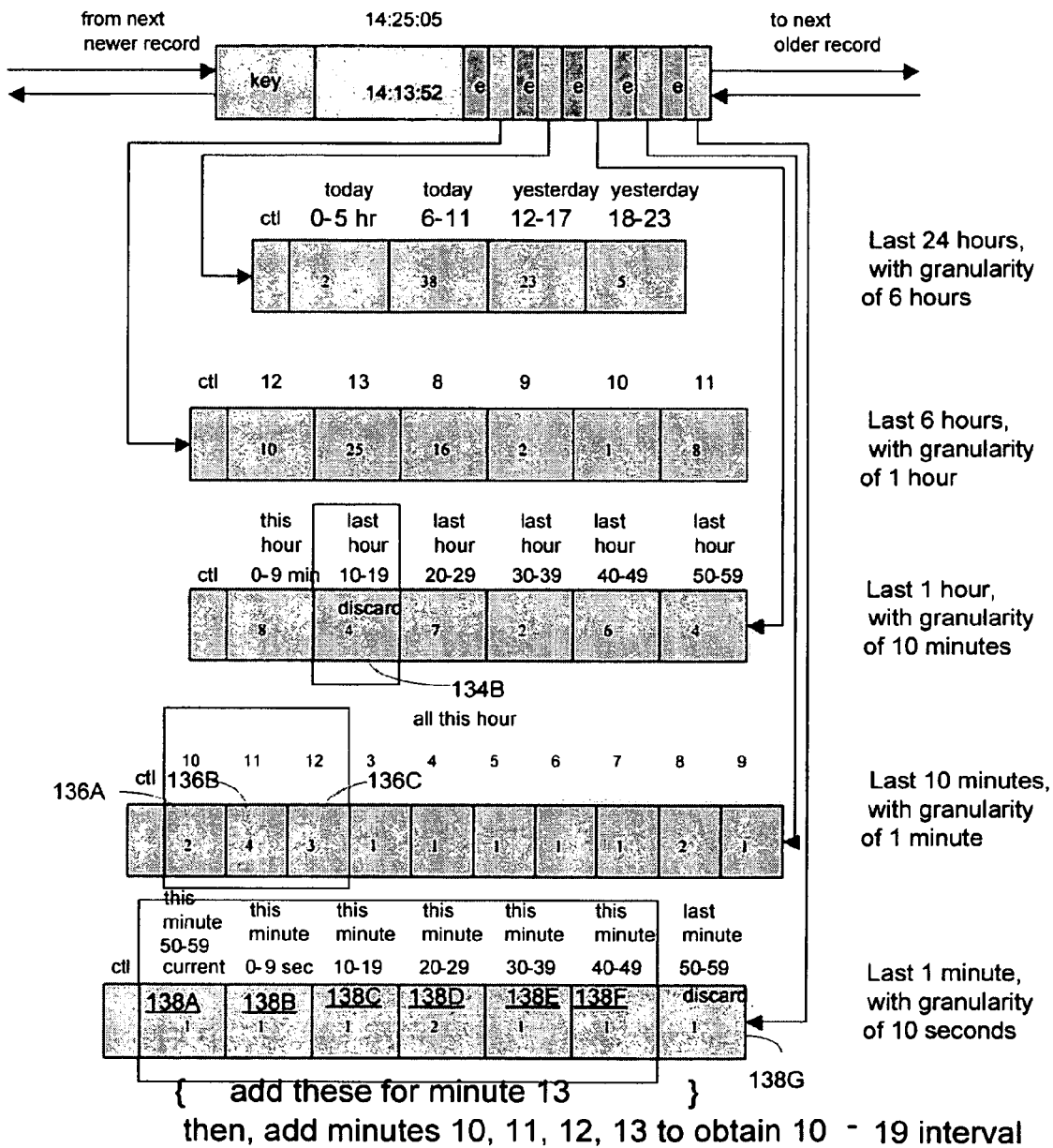
Figure 1D:
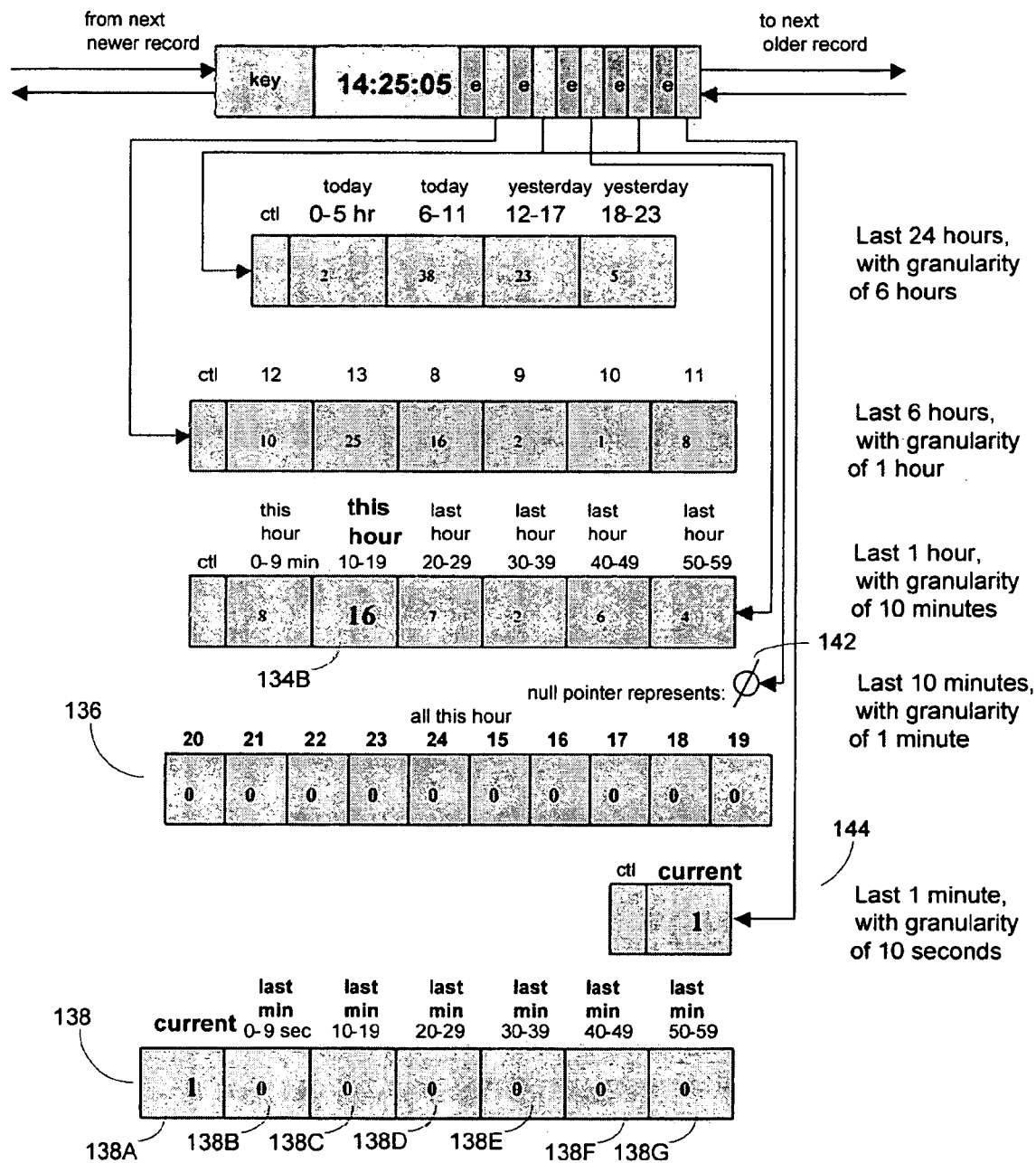

To further illustrate the operation of the time-based memory counters 100, some examples are discussed in details below with reference to FIGS. 1B-1D. Note that details are used for the purposes of illustration only. One of skill in the art would understand the modification possible. Referring to FIG. 1B, the time-based memory counters 100 have last been updated at time 14:13:54. In one embodiment, this is absolute time maintained by the server. The next counter increment arrives at 14:25:05, e.g., 11:11 later in FIG. 1C. Because the time has crossed a time interval boundary to advance to the next ten (10) minute interval, i.e., from 10-19 minutes to 20-29 minutes, the content in the counter 134B, which is associated with the time interval of 10-19 minutes, is discarded. Then a new value is computed for counter 134B. The new value to be put into counter 134B is computed by adding the contents in counters 136A-136C and 138A-138F. In the current example, the sum of the contents in counters 136A-136C and 138A-138F is sixteen (16). Therefore, in FIG. 1D, the counter 134B is updated with the value 16.

Furthermore, the contents in all counters in array 136 become obsolete upon the update at time 14:25:05. Thus, all counters in array 136 are reset to zero (0) upon the update at time 14:25:05. In some embodiments, because all counters in array 136 can be discarded, the pointer pointing to array 136 is replaced with a null pointer 142 as shown in FIG. 1D, instead of resetting values to zero.

The content in counter 138G, which is associated with the 50-59 second time interval, is placed into counter 138A, which is associated with the current time. The rest of the counters in array 138 are reset to 0 or replaced with null pointers upon the update at time 14:25:05. Because the contents of counters 138B-138G are 0 s in one embodiment, the pointer to array 138 may be optimized to point to counter 138A (which contains a "1") as shown in FIG. 1D.

Figure 2:
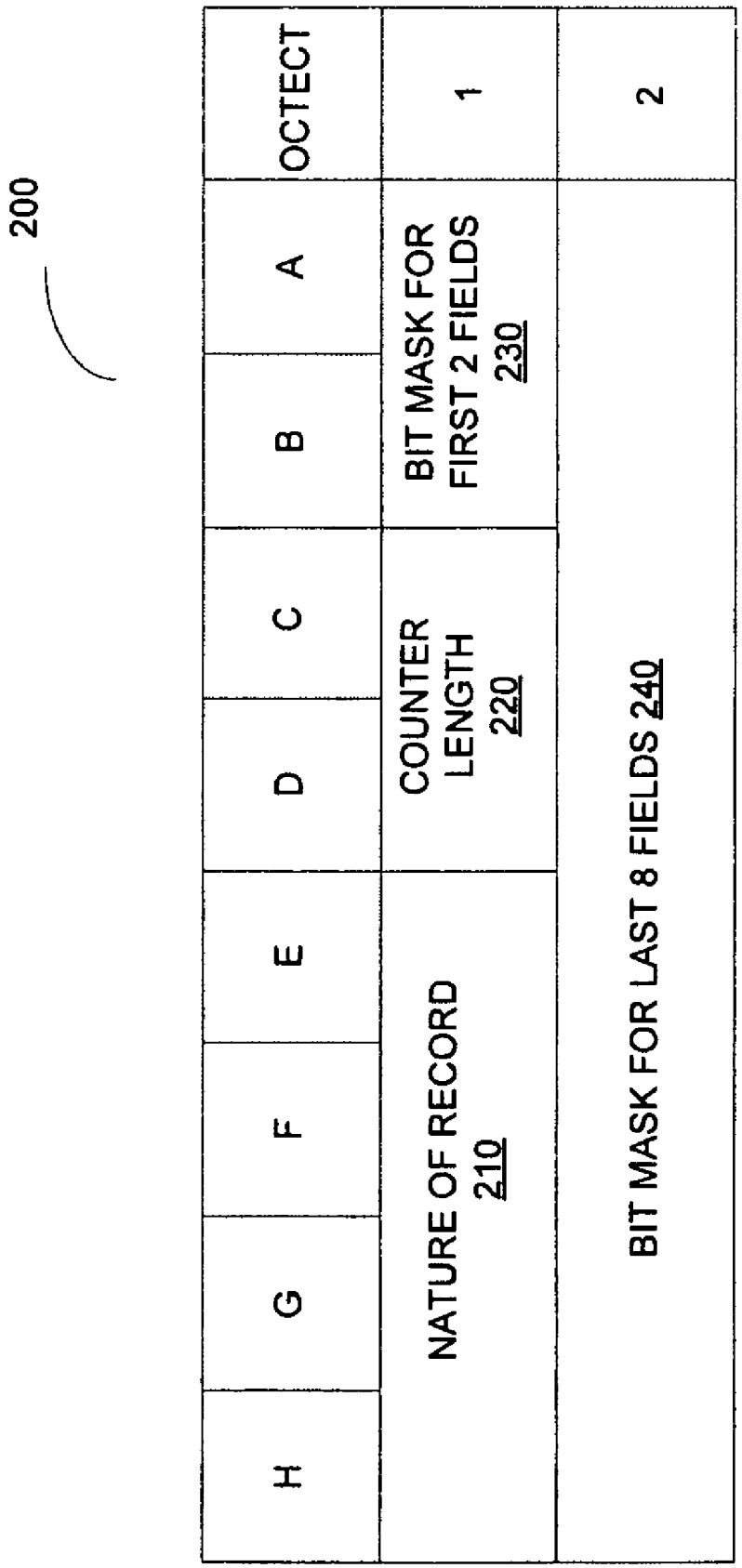
FIG. 2 illustrates one embodiment of a common record header.

In some embodiments, common record headers are used to store information about the counters. FIG. 2 illustrates one embodiment of a common record header. The common record header 200 in one embodiment includes an entry for the nature of record 210, an entry for counter length 220, an entry for one or more bit masks. In one embodiment, there are two bit masks, a first bit mask 230 for the first 2 fields, and a second bit mask 240 for the last eight fields. The entry for the nature of record 210 indicates which type of record the header 200 is associated with, such as index record, key record, counter record, etc. The entry for counter length 220 indicates the number of bytes per counter for all counters in the record associated with the header 200. Using the bit masks 230 and 240, one or more of the counters can be logically removed by setting the corresponding bits in the bit masks 230 and 240.

Figure 3:
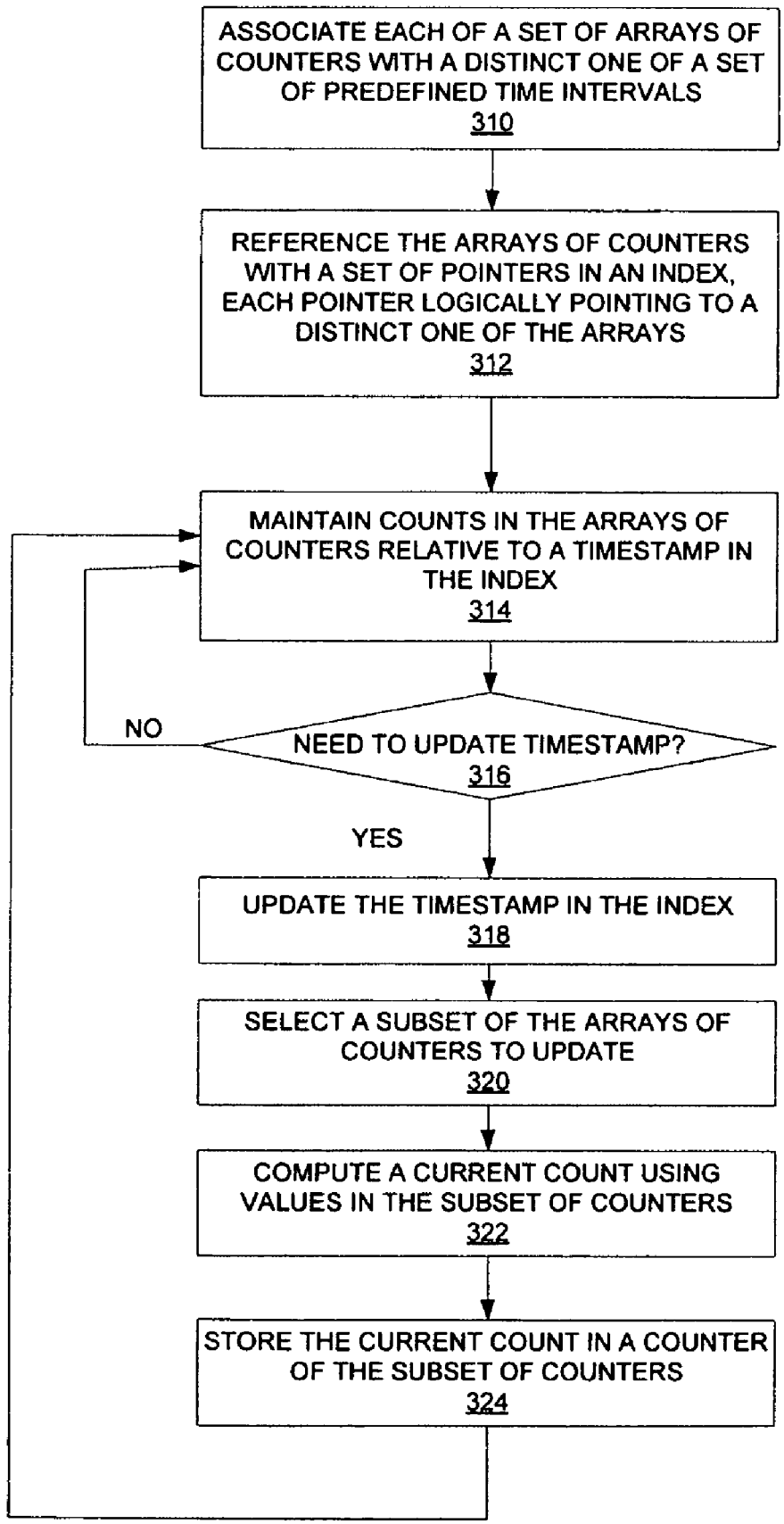
FIG. 3 illustrates a flow diagram of one embodiment of a process to maintain time-based memory counters.

FIG. 3 illustrates a flow diagram of one embodiment of a process to maintain time-based memory counters. The process may be performed by processing logic that may comprise hardware (e.g., circuitry, dedicated logic, programmable logic, microcode, etc.), software (such as instructions run on a processing device), firmware, or a combination thereof.

Initially, processing logic associates each of a set of arrays of counters with a distinct one of a set of predefined time intervals (processing block 310). One example of such a set of arrays of counters has been discussed above with reference to FIGS. 1A-1D. Then processing logic references the arrays of counters with a set of pointers in an index, each pointer points to a distinct one of the arrays (processing block 312). The index further includes a timestamp. Processing logic maintains counts in the arrays of counters relative to the timestamp in the index (processing block 314). Processing logic determines if the timestamp has to be updated (processing block 316). When data is read from the array, the timestamp is updated. If not, processing logic returns to processing block 314 to continue maintaining counts in the arrays of counters. Otherwise, processing logic updates the timestamp in the index (processing block 318).

To update the counters, processing logic first selects a subset of the arrays of counters to update based on the new timestamp (processing block 320). In one embodiment, processing logic compares the previous timestamp with the new timestamp to determine if any predetermined time interval boundaries have been crossed. If so, processing logic selects counters that are associated with the relevant previous and current time intervals for update. Processing logic computes a current count using values in the subset of counters (processing block 322). Finally, processing logic stores the current count in one counter in the subset of counters (processing block 324) and returns to processing block 314. Furthermore, contents in some of the subset of counters may have become obsolete, and thus, these counters may be reset to 0, or their pointers may be set to null pointer.

Figure 4:
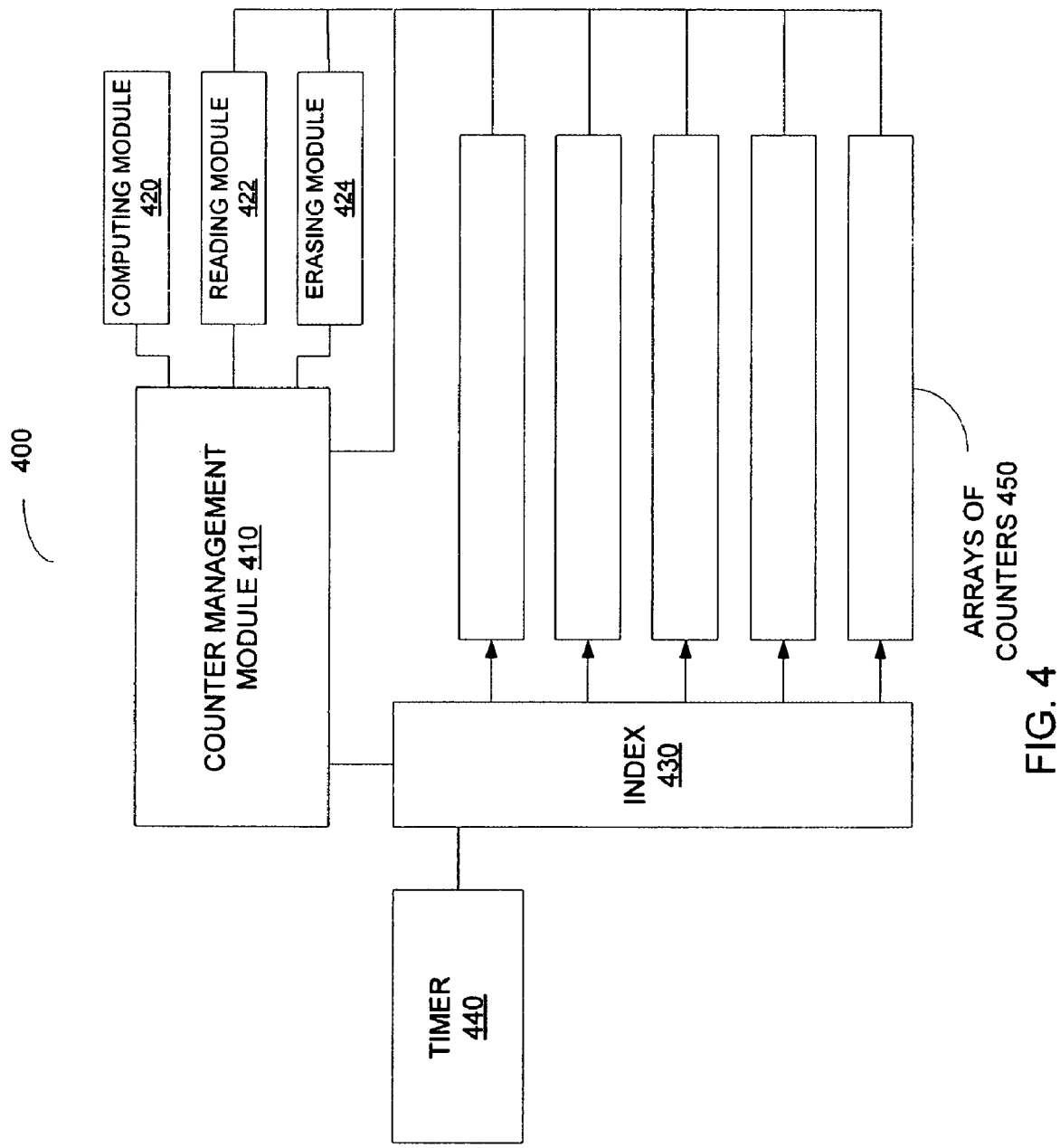
FIG. 4 illustrates one embodiment of an apparatus to maintain time-based memory counters.

FIG. 4 illustrates a functional block diagram of one embodiment of efficient time-based memory counters. The counter 400 includes a counter management module 410, a computing module 420, a reading module 422, an erasing module 424, an index 430, a timer 440, and a number of arrays of counters 450. The arrays of counters 450 are associated with some predetermined time intervals. The arrays of counters 450 may include a set of registers. Alternatively, the arrays of counters 450 may include a number of storage cells in a memory device (e.g., RAM, SRAM, flash memory, etc.). One example of the arrays of counters 450 is discussed in details above with reference to FIGS. 1A-1D.

In some embodiments, the index 430 includes a timestamp and a number of pointers as shown in FIGS. 1A-1D. Each pointer logically points to a distinct one of the arrays of counters 450. The counter management module 410 is operable to update the timestamp in the index 430 with the current time. The counter management module 410 may update the timestamp periodically at some predetermined time, in response to some predetermined event (e.g., receiving a user request). The timer 440 may maintain the current time. The counter management module 4100 may retrieve the current time from the timer 440 and replace the existing timestamp with the current time in order to update the timestamp in the index 430.

In some embodiments, the counter management module 410 further selects a subset of counters from the array of counters 450 based on the existing timestamp and the current time. For example, if a time boundary has been crossed, then the corresponding counter is selected for update. If the boundary crossed is larger than the entire time period covered by one of the arrays of counters 450, then the counts in all counters of the array have to be discarded. Accordingly, the counter management module 410 identifies the counters that are affected and instructs the erasing module 424 to update the affected counters. The counter management module 410 is further coupled to the reading module 422 and the computing module 420. The reading module 422 may read values in some of the counters identified and the computing module 420 may compute a current count using these values. For example, the computing module 420 may include an adder to add up all the counts in the relevant counters to generate the current count. The counter management module 410 may update one of the counters identified with the current count. Details of one example of updating the counters have been described above with reference to FIGS. 1B-1D.

Figure 5:
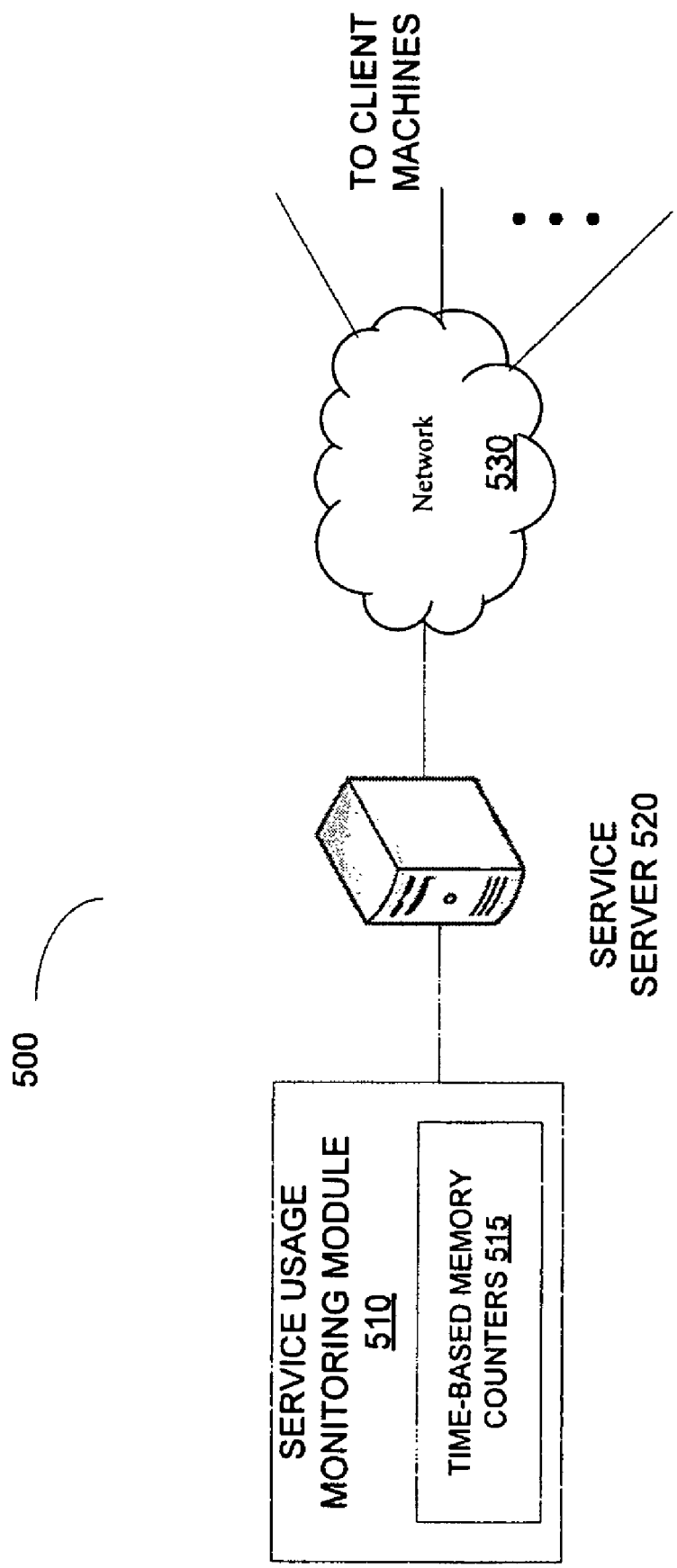
FIG. 5 illustrates one embodiment of a system in which embodiments of the present invention may be implemented.

FIG. 5 illustrates one embodiment of a system in which embodiments of the present invention may be implemented. The system 500 includes a service usage monitoring module 510, a service server 520, and a network 530. The network 530 may include wired and/or wireless connections, secured and/or non-secured connections, local area network (LAN), wide area network (WAN), etc. Via the network 530, the service server 520 is communicably coupled to one or more client machines (e.g., personal computers, workstations, cellular telephones, personal digital assistants, etc.).

In some embodiments, the service server 520 renders one or more types of services to the client machines via the network 530, such as data encryption and data decryption, translation, etc. The service usage monitoring module 510 coupled to the service server 520 monitors customer usage of the service rendered using time-based memory counters 515. In some embodiments, the service usage monitoring module 510 is executed on another computing machine distinct from the service server 520. Alternatively, the service usage monitoring module 510 is executed on the service server 520 as well. The service usage monitoring module 510 collects data on customer usage of the service rendered, which may be used in various areas, such as billing, business planning, customer support, etc. Details of some embodiments of the time-based memory counters 515 have been discussed above.

Note that any or all of the devices of the system 500 and associated hardware may be used in various embodiments of the present invention. However, it can be appreciated that other configurations of the system 500 may include more or fewer devices than those discussed above. The system may alternately be used in any system which would usefully track usage updates, read frequency, etc.

Figure 6:
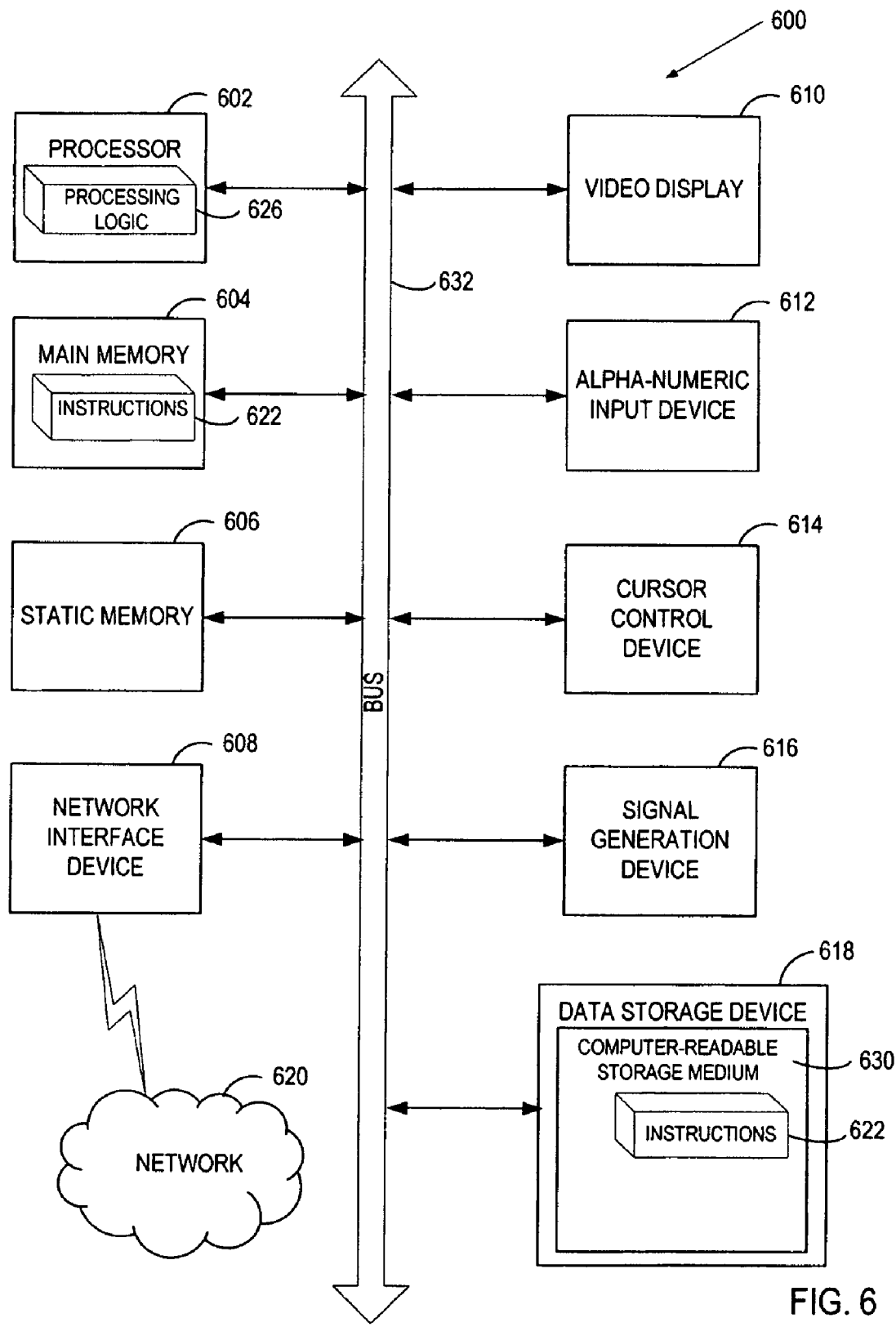
FIG. 6 illustrates a block diagram of an exemplary computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 632.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 402 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 414 (e.g., a mouse), and a signal generation device 616 (e.g., a speaker).

The data storage device 618 may include a machine-accessible storage medium 630 (also known as a machine-readable storage medium) on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

While the computer-readable storage medium 630 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Thus, some embodiments of efficient time-based memory counters have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   arranging a plurality of arrays of counters in layers to associate the plurality of arrays with a plurality of predefined time intervals;
   referencing the plurality of arrays of counters with a plurality of pointers; and
   maintaining an index to provide time-based management of the plurality of arrays of counters, the index comprising a timestamp and the plurality of pointers, each of the plurality of pointers logically pointing to a distinct one of the plurality of arrays.

2. The method of claim 1, wherein the arranging further comprises:
   associating a first time interval of the plurality of time intervals with a first array of the plurality of arrays of counters;
   associating a second time interval of the plurality of time intervals with a second array of the plurality of arrays of counters, the second array layered immediately below the first array; and
   dividing the first time interval of the plurality of time intervals into a plurality of time segments, wherein a duration of each time segment of the plurality of time segments substantially equals a duration of the second time interval.

3. The method of claim 2, further comprising:
   maintaining counts in the plurality of arrays of counters relative to the timestamp.

4. The method of claim 3, further comprising:
   updating the timestamp in the index in response to a request; and
   selecting a subset of the plurality of arrays of counters to update in response to updating the timestamp.

5. The method of claim 4, further comprising:
   computing a current count using values in one or more counters of the subset of the plurality of arrays of counters; and
   storing the current count in a counter of the subset of the plurality of arrays of counters.

6. The method of claim 1, further comprising:
   keeping track of service usage by one or more customers using the plurality of arrays of counters.

7. An apparatus comprising:
an index comprising a timestamp and a plurality of pointers;
a plurality of arrays of counters arranged in layers, each array of the plurality of arrays of counters associated with one of a plurality of time intervals, wherein each of the plurality of pointers logically points to a distinct one of the plurality of arrays, and wherein counts in the plurality of arrays of counters are maintained relative to the timestamp.

8. The apparatus of claim 7, wherein at least one counter of the plurality of arrays of counters comprises a plurality of registers.

9. The apparatus of claim 7, wherein at least one counter of the plurality of arrays of counters comprises a plurality of storage cells in a memory device.

10. The apparatus of claim 7, further comprising:
a timer to maintain a current time; and
a counter management module coupled to the timer, to update the timestamp in the index with the current time in response to a request and to select a subset of the plurality of arrays of counters to update based on the current time.

11. The apparatus of claim 10, further comprising:
a computing module coupled to the counter management module, to compute a current count using values in one or more counters of the subset of the plurality of arrays of counters, wherein the counter management module updates a counter of the subset of the plurality of arrays of counters with the current count.

12. The apparatus of claim 11, wherein the computing module comprises an adder.

13. A system comprising the apparatus of claim 7, further comprising:
a server coupled to a network, to render service to customers; and
a service usage monitoring module coupled to the server, to monitor customer usage of the service using the plurality of arrays of counters.

14. The system of claim 13, wherein the service includes at least one of data encryption and data decryption.

15. A computer-readable medium that provides instructions that, when executed by a processor, will cause the processor to perform operations comprising:
arranging a plurality of arrays of counters in layers to associate the plurality of arrays with a plurality of predefined time intervals;
referencing the plurality of arrays of counters with a plurality of pointers; and
maintaining an index to provide time-based management of the plurality of arrays of counters, the index comprising a timestamp and the plurality of pointers, each of the plurality of pointers logically pointing to a distinct one of the plurality of arrays.

16. The computer-readable medium of claim 15, wherein the arranging further comprises:
associating a first time interval of the plurality of time intervals with a first array of the plurality of arrays of counters;
associating a second time interval of the plurality of time intervals with a second array of the plurality of arrays of counters, the second array layered immediately below the first array; and
dividing the first time interval of the plurality of time intervals into a plurality of time segments, wherein a duration of each time segment of the plurality of time segments substantially equals a duration of the second time interval.

17. The computer-readable medium of claim 15, wherein the operations further comprise:
maintaining counts in the plurality of arrays of counters relative to the timestamp.

18. The computer-readable medium of claim 17, wherein the operations further comprise:
updating the timestamp in the index in response to a request; and
selecting a subset of the plurality of arrays of counters to update in response to updating the timestamp.

19. The computer-readable medium of claim 18, wherein the operations further comprise:
computing a current count using values in one or more counters of the subset of the plurality of arrays of counters; and
storing the current count in a counter of the subset of the plurality of arrays of counters.

20. The computer-readable medium of claim 15, wherein the operations further comprise:
keeping track of service usage by one or more customers using the plurality of arrays of counters.

* * * * *